United States Patent
Henderson, III et al.

(10) Patent No.: US 6,174,025 B1
(45) Date of Patent: Jan. 16, 2001

(54) SUN ROOF AIR DAM WIND NOISE REDUCER

(75) Inventors: Robert E. Henderson, III, Armada; George G. Fradl, Chesterfield; James Albert DeGroot, Macomb Township, all of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/387,004

(22) Filed: Aug. 31, 1999

(51) Int. Cl.⁷ .......................................................... B60J 7/22
(52) U.S. Cl. ............................................ 296/217; 296/223
(58) Field of Search ...................................... 296/217, 223

(56) References Cited

U.S. PATENT DOCUMENTS

| | | | |
|---|---|---|---|
| 3,904,239 | 9/1975 | Jardin | 296/217 |
| 4,142,759 | 3/1979 | Bienert | 296/217 |
| 4,986,598 | 1/1991 | Yamauchi et al. | 296/217 |
| 5,031,959 | 7/1991 | Queveau | 296/223 |
| 5,045,765 * | 9/1991 | Wissler | 296/223 X |
| 5,178,436 | 1/1993 | Eberius et al. | 296/217 |
| 5,431,477 | 7/1995 | Smith et al. | 296/217 |
| 5,601,330 | 2/1997 | Ulbrich et al. | 296/217 |
| 5,671,970 | 9/1997 | Edelmann | 296/217 |
| 5,734,727 | 3/1998 | Flaherty et al. | 381/81 |
| 5,765,908 | 6/1998 | Kelm | 296/223 |
| 5,833,305 | 11/1998 | Watzlawick et al. | 296/217 |

* cited by examiner

Primary Examiner—Dennis H. Pedder
(74) Attorney, Agent, or Firm—Roland A. Fuller III

(57) ABSTRACT

An improved sunroof assembly is provided. The sunroof assembly includes a sunroof portion and an air dam portion. The sunroof portion includes a sunroof panel which is positionable between an open and a closed position. The air dam portion includes an air dam structure, a drive assembly and a wind noise determining portion. The air dam structure is pivotally coupled to the sunroof portion and is positionable between a retracted position and an extended position. The drive assembly is coupled to the sunroof portion and the air dam structure and operable for positioning the air dam structure between the retracted position and the extended position. The wind noise determining system determines the amount and characteristics of the noise transmitted into the vehicle passenger compartment through sunroof assembly and generates a signal in response thereto. Drive assembly interprets the signal and selectively repositions air dam structure in predetermined control method to vary the position of air dam structure so as to minimize the wind noise transmitted into a vehicle passenger compartment.

20 Claims, 3 Drawing Sheets

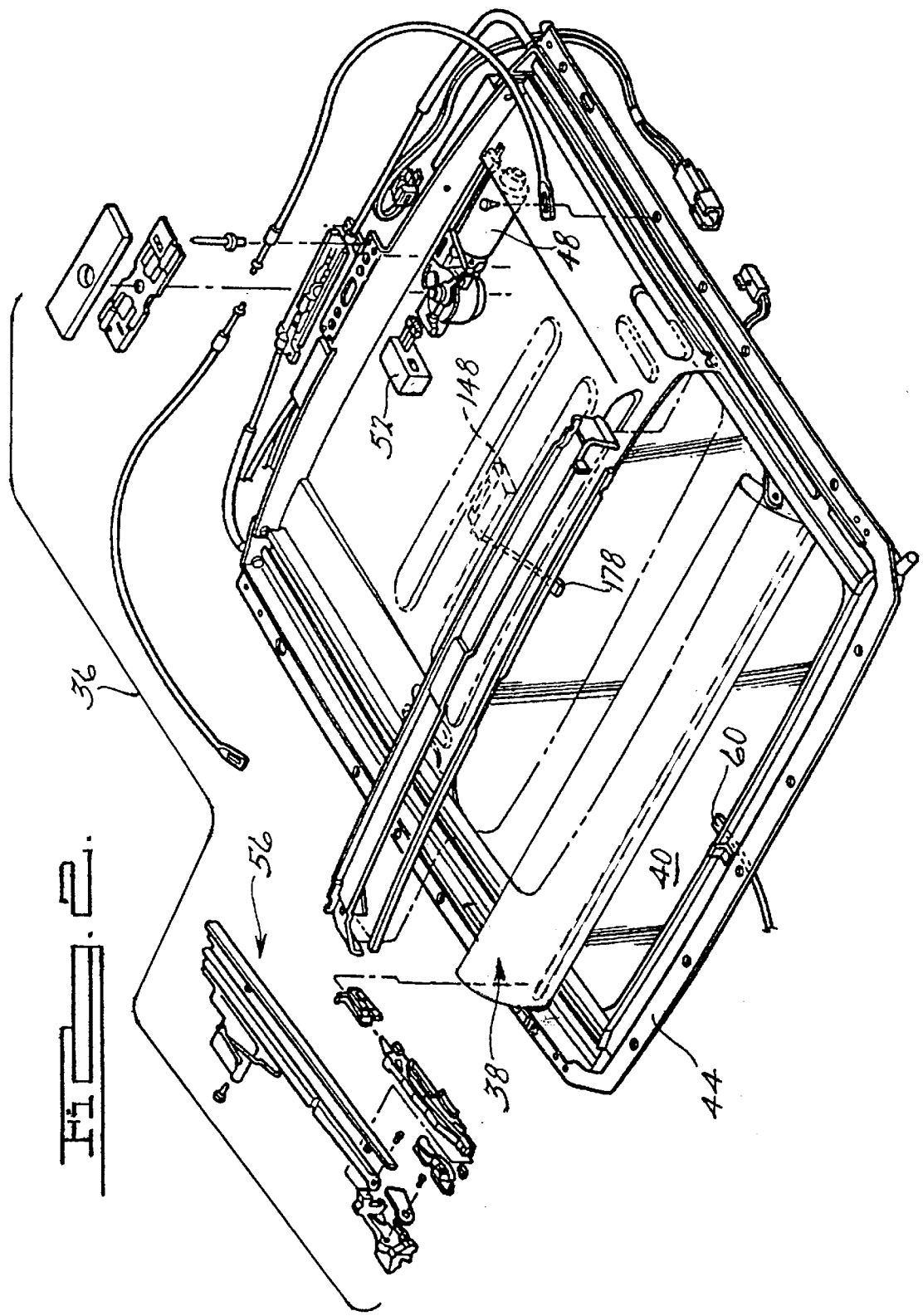

SUN ROOF AIR DAM WIND NOISE REDUCER

BACKGROUND OF THE INVENTION

1. Technical Field

The present invention pertains generally to vehicle sunroof systems and more particularly, to vehicle sunroof systems which attenuate wind noise transmitted into the vehicle passenger compartment while the vehicle is operated and the sunroof is in an open condition.

2. Discussion

It has become commonplace to employ sunroof assemblies in automotive vehicle roof systems. Such sunroof assemblies offer sunlight access through a fixed vehicle roof opening when a sunroof panel is disposed in either an open or closed position, and an opaque sunshade is openly slid. Furthermore, open air motoring access is provided through a sun roof aperture when the sunroof panel is fully opened, thereby increasing ventilation within the passenger compartment.

Most conventional sunroof assemblies have a sunroof tub, an electric motor, a cable driven drive mechanism and a sunroof panel. A driver accessible switch is also typically provided for selectively energizing and de-energizing the electric motor in a manual manner. These conventional sunroof assemblies move the sunroof panel between a fully closed position generally flush with the exterior of the vehicle roof and a fully open position either stowed below or above the stationary vehicle roof.

Many conventional sunroof assemblies have problems with noise that is transmitted into the vehicle passenger compartment which results from the flow of air proximate the sunroof aperture. One component of the wind noise typically results from wind buffeting and is generally characterized by low frequencies. Another component of the wind noise typically results from wind rushing over the vehicle trim and other vehicle components (e.g., antenna) and is generally characterized by high frequencies.

In an effort to attenuate the low frequency portion of the wind noise, air dams have frequently been incorporated into sunroof assemblies. These air dams generally pivot from a retracted position when the sunroof panel is into and an extended position when the sunroof panel is opened. Various air dam constructions have been suggested or employed to affect the low-frequency portion of wind noise and/or to improve air flow into the passenger compartment. While air dams have been employed with some success in attenuating low-frequency noise in certain situations, several drawbacks have been noted.

One drawback relates to the positioning of the air dam at the fully extended position regardless of the speed of the vehicle or the amount that sunroof panel is open. It is well known in the art that both of these factors greatly influence the magnitude of the low-frequency portion of the wind noise, yet these systems do not adjust the position of the air dam between the retracted and extended positions to optimize performance of the air dam. Furthermore, these air dams are typically constructed with little regard to substantially attenuate the high-frequency portion of the wind noise.

Other efforts in this area have focused on variable positioning of the sunroof panel as the vehicle speed changes. While this strategy has greatly attenuated the magnitude of the low-frequency portion of the wind noise, this strategy does not substantially attenuate the magnitude of the high-frequency portion of wind noise.

SUMMARY OF THE INVENTION

It is therefore one object of the present invention to provide an improved sunroof apparatus which attenuates the wind noise transmitted into the vehicle passenger compartment from a sunroof aperture.

It is another object of the present invention to provide an improved sunroof apparatus having an air dam which may be selectively positioned between a retracted position and an extended position to attenuate portions of the wind noise which is transmitted into a vehicle passenger compartment.

An improved sunroof assembly is provided. The sunroof assembly includes a sunroof portion and an air dam portion. The sunroof portion includes a sunroof panel which is positionable between an open and a closed position. The air dam portion includes an air dam structure, a drive assembly and a wind noise determining portion. The air dam structure is pivotally coupled to the sunroof portion and is positionable between a retracted position and an extended position. The positioning assembly coupled to the sunroof portion and the air dam structure and operable for positioning the air dam structure between the retracted position and the extended position. The wind noise determining system determines the amount and characteristics of the noise transmitted into the vehicle passenger compartment through sunroof assembly and generates a signal in response thereto. Positioning apparatus interprets the signal and selectively repositions air dam structure in predetermined control method to vary the position of air dam structure so as to minimize the wind noise transmitted into a vehicle passenger compartment.

Additional advantages and features of the present invention will become apparent from the subsequent description and the appended claims, taken in conjunction with the accompanying drawings.

BRIEF DESCRIPTION OF THE DRAWINGS

FIG. 2 is an exploded perspective view of a portion of the vehicle of FIG. 1;

DETAILED DESCRIPTION OF THE PREFERRED EMBODIMENT

Figure 1:
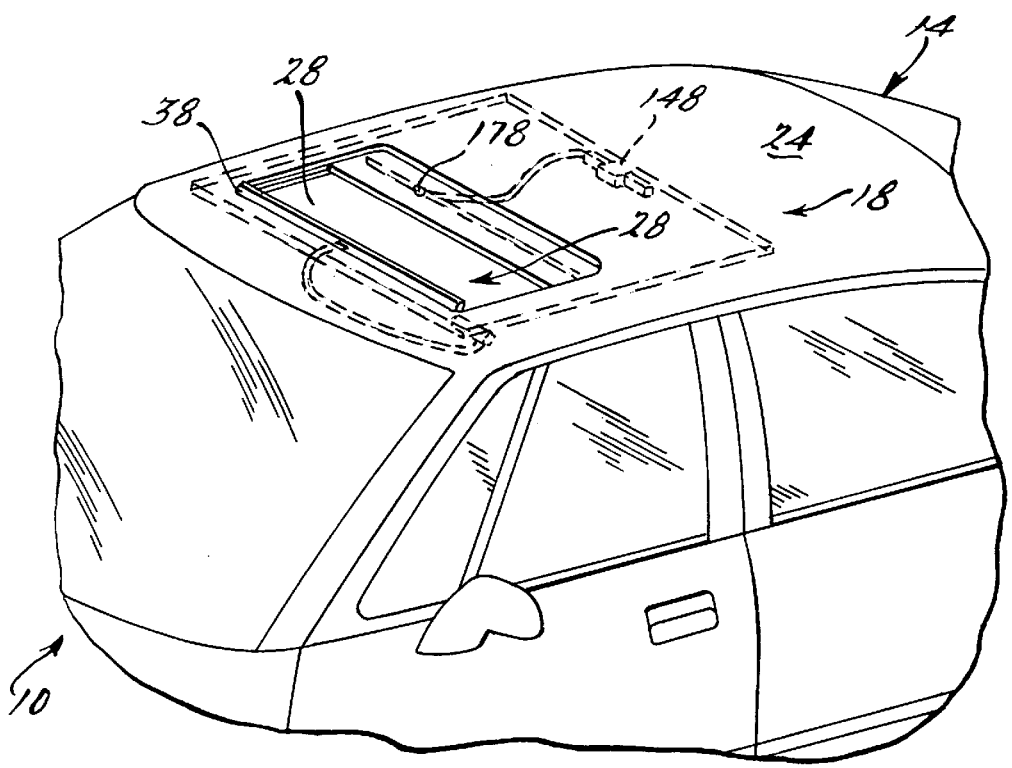
FIG. 1 is a perspective view of a portion of a vehicle incorporating a sunroof constructed according to the teachings of the present invention.

With reference to FIGS. 1 and 2 of the drawings, a motor vehicle constructed in accordance with the teachings of the preferred embodiment of the present invention is generally identified at reference numeral 10. As will be discussed in greater detail below, vehicle 10 includes a vehicle body 14 and a closure apparatus, such as sunroof apparatus 18. Although the particular closure apparatus illustrated is a sunroof apparatus, it will be understood that the teachings of the present invention have applicability to other types of closure members which are coupled to the body of a structure to selectively cover an aperture formed into the body.

Body 14 includes a generally horizontal roof member 24 defining a sunroof aperture 28. Roof member 24 is disposed above the vehicle passenger compartment 32. Sunroof aperture 28 extends through roof member 24 to permit air and light to enter into passenger compartment 32.

Sunroof apparatus 18 is disposed within sunroof aperture 28 includes a sunroof portion 36 and an air dam portion 38. Sunroof portion includes a sunroof panel 40, a sunroof tub 44, a first actuator 48, an electronic control unit 52 and a pair of slide mechanisms 56 (only one shown). A driver-accessible toggle or push/push switch 60 is coupled to electronic control unit 52 and is operable for causing first actuator 48 to actuate to open or close sunroof panel 40 as desired.

Figure 3:
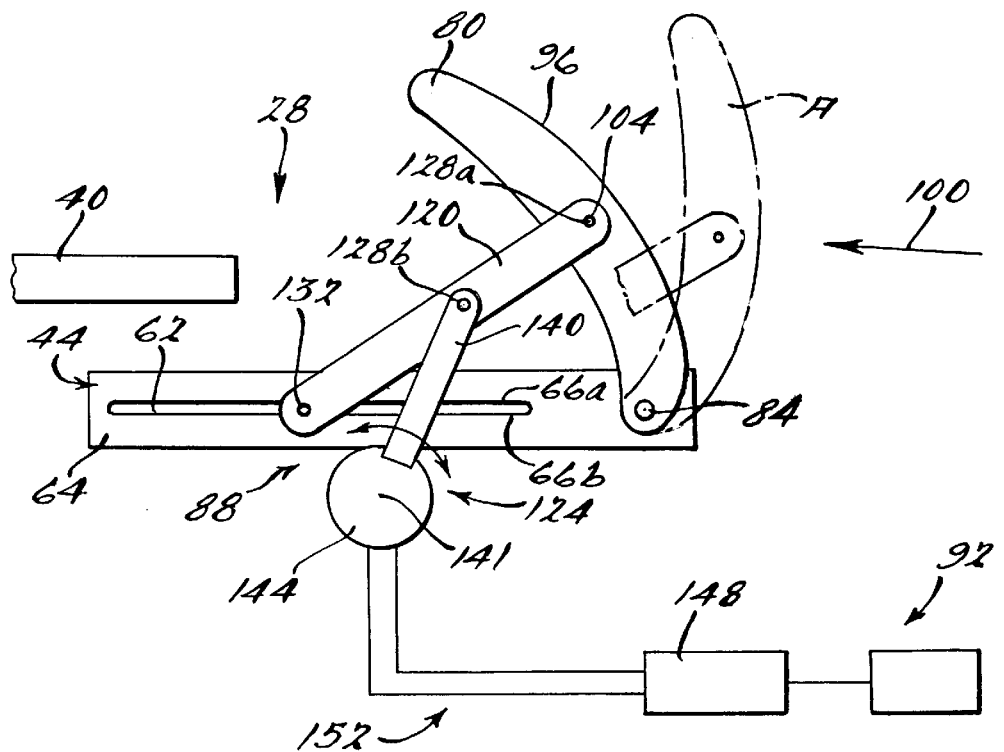
FIG. 3 is a cross-sectional view of the vehicle of FIG. 1 taken along the line 3—3.

As best shown in FIG. 3, sunroof tub 44 includes a lateral sidewall 62 which extends generally vertically upward from passenger compartment 32. Lateral sidewall includes a positioning aperture 64 having a major axis 66 which is generally parallel the longitudinal axis of vehicle 10. Positioning aperture 64 is bounded by a pair of spaced apart sidewalls 66a, 66b.

Sunroof panel 40, sunroof tub 44, first actuator 48, slide mechanisms 56a, 56b and switch 60 are otherwise conventional in construction and do not require further discussion. Sunroof tub 44 is disposed within sunroof aperture 28 and coupled to roof member 24 in a conventional manner.

As best shown in FIG. 3, air dam portion 38 is shown to include an air dam structure 80, a first pin 84, a positioning apparatus 88 and a wind noise determining apparatus 92. First pin 84 pivotally couples air dam structure 80 to tub 44 and permits air dam structure 80 to pivot between a retracted position (not specifically shown) and a fully extended position as indicated by reference letter A. Air dam structure 80 includes a curved exterior surface 96 which is operable for directing air flow 100 proximate sunroof aperture 28. The manner in which exterior surface 96 directs air flow 100 is dependant upon the positioning of air dam structure 80 between the retracted and extended positions. Air dam structure 80 is conventional in this regard and this aspect need not be discussed in further detail. Air dam structure 80 also includes a pin aperture 104 located in one of its lateral sides 108. Pin aperture 104 will be discussed in further detail, below.

Positioning apparatus 88 is shown to include a first positioning member 120, a drive assembly 124, and first and second pivot pins 128a, 128b and a roller pin 132. First pivot pin 128a pivotally couples first positioning member 120 to air dam structure 80. Roller pin 132 extends through a pin aperture (not shown) in first positioning member 120 and through positioning aperture 62. Roller pin 132 is coupled to first positioning member 120 and slidingly engages at least one of the sidewalls 66a, 66b. Drive assembly 124 is pivotally coupled to first positioning member 120 through second pivot pin 128b. Operation of drive assembly 124 causes a second positioning member 140 to rotate about a pivot point 141 to cause first positioning member 120 to rotate air dam structure 80 between the retracted and extended positions as desired.

In the particular embodiment illustrated, drive assembly 124 includes a second positioning member 140, a drive motor 144, preferably a stepper motor or a servo motor, and a controller 148. A first end of second positioning member 140 is pivotally coupled to first positioning member through second pivot pin 128b. A second, distal end of second positioning member 140 is coupled for rotation with the output shaft of motor 144. Controller 148 is electrically coupled to drive motor 144 through wire harness 152 and controls the operation of drive motor 144. Drive motor 144 can be controlled to rotate in a first direction to transmit an upwardly directed force from second positioning member 140 to first positioning member 120 and cause air dam structure 80 to be positioned toward or into the extended position. Similarly, drive motor 144 may be controlled to rotate in a second direction to transmit a downwardly directed force from second positioning member 140 to first positioning member 120 and cause air dam structure 80 to be positioned toward or into the retracted position.

Figure 4:
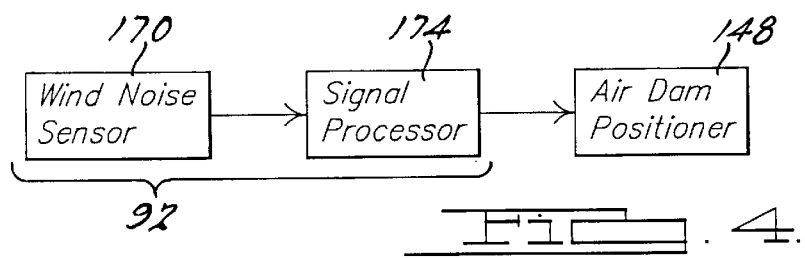
FIG. 4 is a schematic diagram of the electrical control system for a portion of the sunroof of the present invention.
Figure 5:
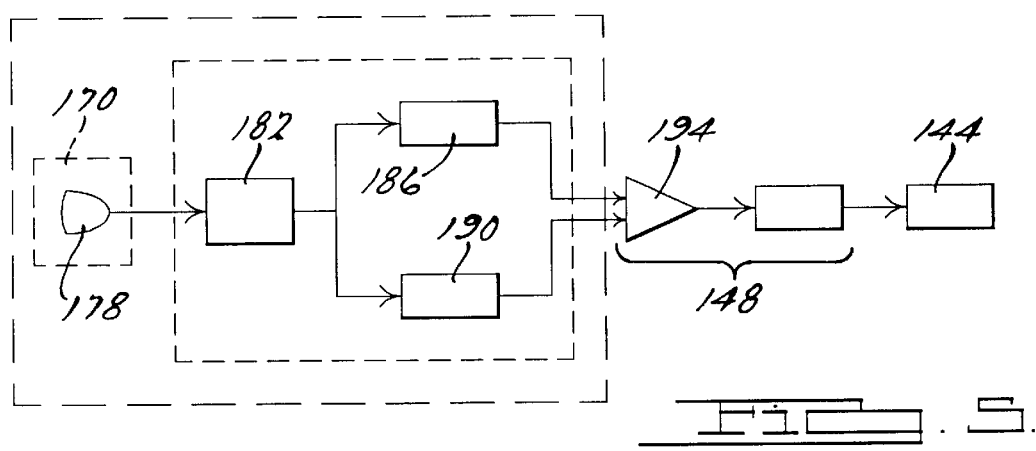
FIG. 5 is a diagram schematically illustrating the a portion of the electrical control system of FIG. 4.

In FIG. 4, wind noise determining apparatus 92 is operable for determining the magnitude and character of the wind noise transmitted into passenger compartment 32. In the particular embodiment illustrated in FIGS. 5, wind noise determining apparatus 92 includes a wind noise sensor 170 and a signal processor 174. With additional reference to FIGS. 1 and 4, wind noise sensor 170 is shown to include a microphone 178. Microphone 178 is mounted to vehicle body 14 proximate sunroof aperture 28 and is operable for producing a microphone output signal indicative of the amplitude and character of the noise entering passenger compartment 32 which results from air flow 100. Microphone 178 is conventional and as such, will not be discussed in further detail.

Microphone output signal is received by signal processor 174 where it is processed in a predetermined manner. In the particular embodiment illustrated, microphone output signal is processed through an amplifier 182 after which it is split into two portions. A first portion of the microphone output signal is directed into a first processor 186 and a second portion of the microphone output signal is directed into a second processor 190. First processor 186 is operable for filtering the first portion of the microphone output signal to remove all of the signal except for the portion which is associated with a predetermined first range of wind noise frequencies. Similarly, second processor 190 is operable for filtering the second portion of the microphone output signal to remove all of the signal except for the portion which is associated with a predetermined second range of wind noise frequencies.

In a preferred embodiment of the present invention, first processor 186 is operable for filtering out all of the microphone output signal except for the portion of the signal that relates low-frequency noise having a maximum frequency of about 200 Hz and second processor 190 is operable for filtering out all of the microphone output signal except for the potion of the signal that relates to high-frequency noise having a frequency below about 6 kHz. Optimal frequency ranges may need to be tuned to a particular model of vehicle to compensate for variances in the generation of noise which are design related, including the placement of the vehicle radio antenna, the rake or angle of the vehicle windshield, the volume of the passenger compartment, the size of the sunroof aperture 28, etc.

Also in a preferred embodiment, first and second processors 186 and 190 are operable for producing first and second processor output signals, respectively, which are indicative of the amount of low-frequency and high-frequency noise, respectively. Preferably, first and second processor output signals are digital signals indicative of whether the magnitude of the low-frequency and high-frequency noise has exceeded predetermined low-frequency and high-frequency noise levels, respectively.

The first and second processor output signals are received by controller 148. Then, as necessary, controller 148 controls drive motor 144 according to a predetermined control strategy to adjust air dam structure 80 between the retracted and extended positions to balance the first and second frequency ranges of the wind noise in a predetermined manner. In the particular embodiment illustrated, controller 148 includes an operational amplifier 194 which compares the digital first and second processor output signals.

When sunroof panel 40 is to be moved to the closed position, drive motor 144 may be controlled to draw air dam structure 80 into the retracted position in a predetermined manner. Alternatively, as best shown in FIG. 3, first positioning member 120 may be configured in a manner such that as first actuator 48 drives sunroof panel 40 toward the closed position, the leading edge 200 of sunroof panel 40 contacts and transmits a downwardly directed force to first positioning member 120, causing first positioning member 120 to rotate about first pivot pin 128a into the retracted position.

While the sunroof apparatus of the present invention has been described thus far as having an air dam positioning apparatus which includes a drive motor and a wind noise determining apparatus which includes a microphone and filtering the wind noise signal at two fixed ranges, those skilled in the art will appreciate that the invention, in its broader aspects, may be constructed somewhat differently. For example, air dam positioning apparatus may include various other devices to selectively position air dam structure 80 between the retracted and extended positions. Such devices are conventionally known and include, for example, linear motors, variable displacement solenoids, fluid-powered cylinders or a drive rack.

Figure 6:
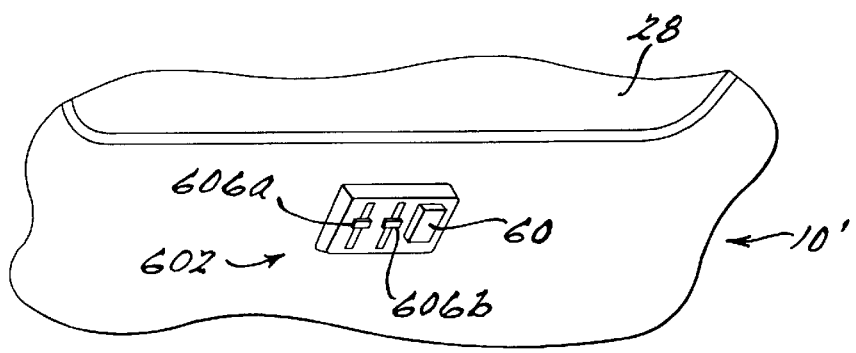
FIG. 6 is a perspective view of a portion of the vehicle of FIG. 1.

Another example of a somewhat different construction of the sunroof apparatus of the present invention is illustrated in FIG. 6. A control panel 602 adjacent to sunroof apparatus 18' includes first and second slider control buttons 606a, 606b in addition to switch 60. First and second slider control buttons 606a, 606b are operable for adjusting the threshold levels of the high-frequency noise and low-frequency noise, respectively. These controls permit the vehicle occupant to adjust the control of the air dam structure to favor increased attenuation of one type of noise. For example, if the vehicle occupants find the high-frequency noise particularly irritating or distracting, they may adjust the control of air dam structure to focus on the attenuation of the high-frequency noise so as to slightly reduce it or eliminate it altogether.

Alternatively, first and second slider control buttons 606a, 606b may be operable for adjusting the value of the maximum and minimum attenuation frequencies to accommodate the hearing of particular vehicle occupants. This permits the minimum attenuation frequency associated with the high-frequency wind noise to be adjusted from 6 kHz to 5 kHz, for example.

Figure 7:
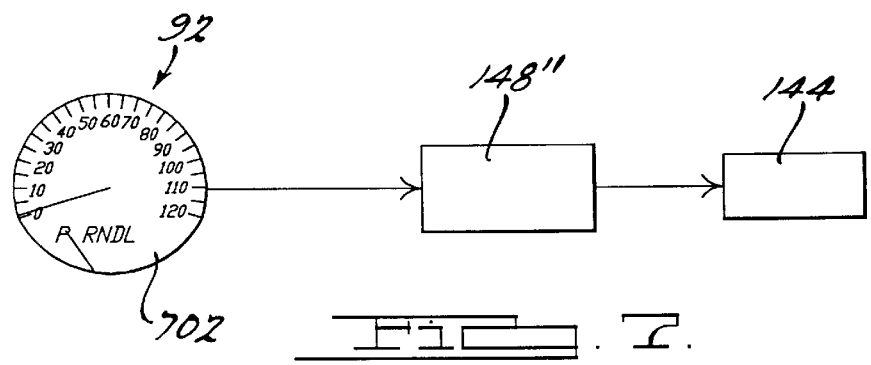
FIG. 7 is a schematic diagram of a system constructed according to an alternate embodiment of the present invention.

Another example is illustrated in FIG. 7. Wind noise determining apparatus "is illustrated as a speedometer 702 which produces a speed signal indicative of the speed of vehicle 10". Speed signal is received by controller 148 " which utilizes a predetermined methodology to control the structure 80. The predetermined methodology is based upon empirical testing to associate the speed of vehicle 10" to the optimal position of the air dam structure.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An air dam apparatus for controlling a flow of air proximate an aperture in a structure, the air dam apparatus comprising:

an air dam structure adapted to be coupled to the structure and positionable between a retracted position and an extended position wherein the air dam structure extends upwardly into the flow of air;

means for determining a magnitude of wind noise associated with the flow of air; and means for selectively positioning the air dam structure between the retracted and extended positions, the positioning means positioning the air dam structure in response to the magnitude of wind noise.

2. The air dam apparatus of claim 1, wherein the means for determining the magnitude of wind noise includes a microphone.

3. The air dam apparatus of claim 2, wherein the means for determining the magnitude of wind noise further includes a first filter producing a first filter output, the first filter operable for filtering out a first range of noise frequencies.

4. An air dam apparatus for controlling a flow of air proximate an aperture in a structure, the air dam apparatus comprising:

an air dam structure adapted to be coupled to the structure and positionable between a retracted position and an extended position;

means for determining a magnitude of wind noise associated with the flow of air, the means for determining the magnitude of wind noise including a microphone, a first filter producing a first filter output and filter adjusting means, the first filter operable for filtering out a first range of noise frequencies and the filter adjusting means for adjusting the first range of noise frequencies; and means for selectively positioning the air dam structure between the retracted and extended positions, the positioning means positioning the air dam structure in response to the magnitude of wind noise.

5. The air dam apparatus of claim 3, wherein the means for determining the magnitude of wind noise further includes a second filter producing a second filter output, the second filter operable for filtering out a second range of noise frequencies, the positioning means positioning the air dam so as to affect the first and second filter outputs.

6. The air dam apparatus of claim 5, wherein the first range of frequencies is above about 200 Hz.

7. The air dam apparatus of claim 1, wherein the means for determining the magnitude of wind noise uses a relative speed of the structure to at least partially determine the magnitude of wind noise.

8. The air dam apparatus of claim 1, wherein the positioning means includes a stepper motor.

9. The air dam apparatus of claim 1, wherein the positioning means includes a servo motor.

10. The air dam apparatus of claim 5, wherein the second range of filter frequencies is below about 6 kHz.

11. A sunroof apparatus for a vehicle comprising:

a sunroof tub defining a sunroof aperture;

a sunroof panel structure coupled to said sunroof tub and slidable between a first sunroof panel position wherein said sunroof panel substantially closes the sunroof aperture and a second sunroof panel position wherein the sunroof panel clears at least a portion of the sunroof tub; and an air dam apparatus having an air dam structure, means for positioning the air dam structure and means for determining a magnitude of wind noise associated with a flow of air over said air dam structure, said air dam structure pivotably coupled to a forward side of said sunroof tub and positionable between a retracted position and an extended position wherein the air dam structure extends upwardly into the flow of air, said air dam positioning means coupled to said air dam structure and said sunroof tub and operable for selectively positioning said air dam structure between the retracted position and the extended position in response to said wind noise magnitude.

12. The sunroof apparatus of claim 11, wherein the means for determining the magnitude of wind noise includes a microphone.

13. The sunroof apparatus of claim 12, wherein the means for determining the magnitude of wind noise further includes a first filter producing a first filter output, the first filter operable for filtering out a first range of noise frequencies.

14. A sunroof apparatus for a vehicle comprising:

a sunroof tub;

a sunroof panel structure coupled to said sunroof tub and slidably positionable within said sunroof tub between a first sunroof panel position and a second sunroof panel position; and an air dam apparatus having an air dam structure, an air dam drive and means for determining a magnitude of wind noise associated with a flow of air over said air dam structure, said air dam structure pivotably coupled to said sunroof tub and positionable between a retracted position and an extended position, said means for determining the magnitude of wind noise including a microphone, a first filter and filter adjusting means, said first filter producing a first filter output, said first filter operable for filtering out a first range of noise frequencies, said filter adjusting means for adjusting the first range of noise frequencies, said air dam drive coupled to said air dam structure and said sunroof tub and operable for selectively positioning, said air dam structure in response to said wind noise magnitude.

15. The sunroof apparatus of claim 13, wherein the means for determining the magnitude of wind noise further includes a second filter producing a second filter output, the second filter operable for filtering out a second range of noise frequencies, the positioning means positioning the air dam so as to affect the first and second filter outputs.

16. The sunroof apparatus of claim 15, wherein the first range of frequencies is above about 200 Hz.

17. The sunroof apparatus of claim 11, wherein the means for determining the magnitude of wind noise uses a relative speed of the vehicle to at least partially determine the magnitude of wind noise.

18. The sunroof apparatus of claim 11, wherein the air dam drive includes a stepper motor.

19. The sunroof apparatus of claim 11, wherein the air dam drive includes a servo motor.

20. The sunroof apparatus of claim 15, wherein the second range of filter frequencies is below about 6 kHz.

* * * * *